3,183,722
DEVICE FOR INDICATING PRESSURE IN LIQUIDS AND GASES
Hans Peter Olof Unger, Halsingehojden 11, Stockholm, Sweden, and Jan Egon Tengberg, Skansvagen 53, Sollentuna, Sweden
Filed May 22, 1962, Ser. No. 196,693
Claims priority, application Sweden, May 29, 1961, 5,603/61
6 Claims. (Cl. 73—388)

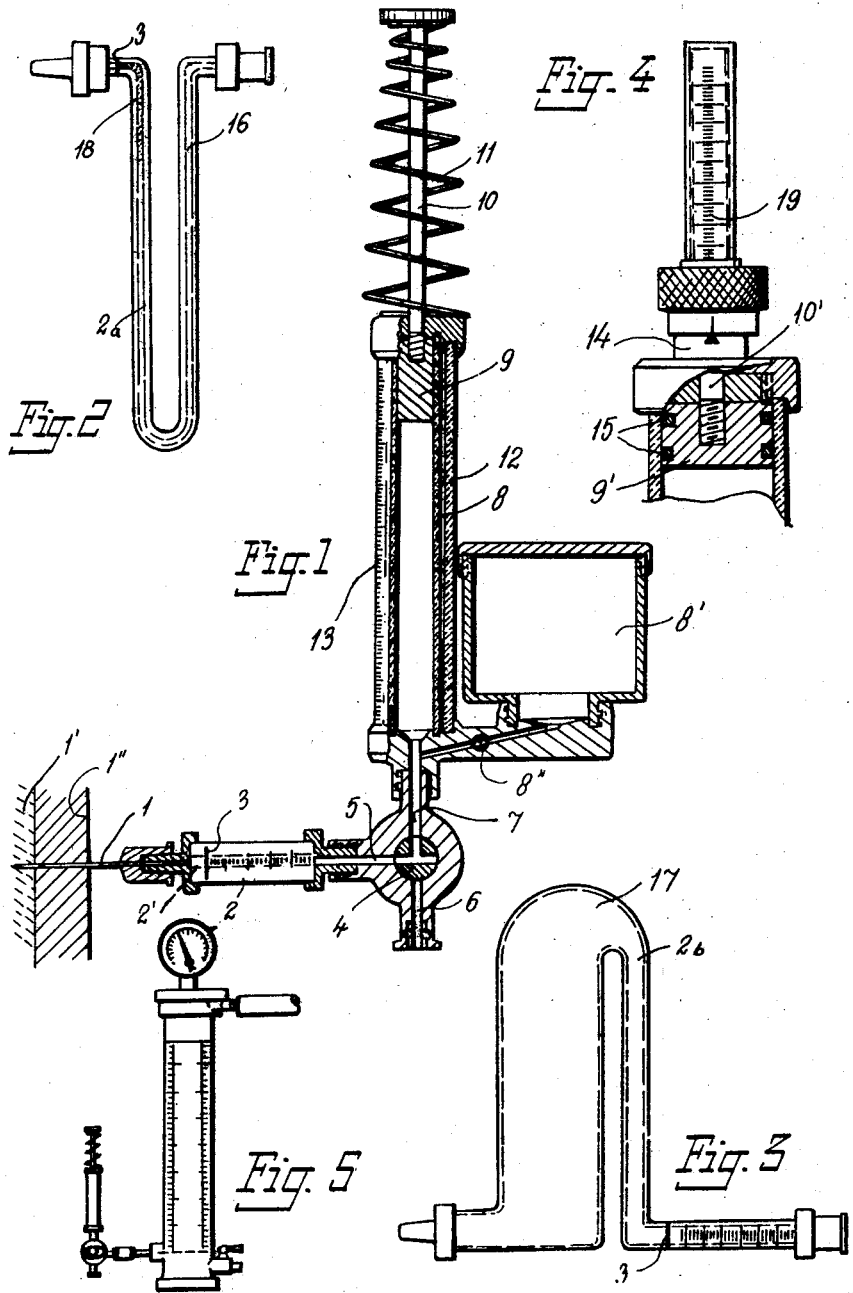

The present invention shows a device for indicating pressure, or variations in pressure, in liquids and gases of such properties as for instance viz liquor, blood, pleuroexudate, ascites and pneumothoraxic gases, without thereby causing loss of the mentioned medium, as well as enabling the medium to be introduced or drained from the device, upon which a new pressure indicating may be performed, without necessitating withdrawal of the device from the medium in question.

The primary purpose of the present device is to enable the execution, by sterile work methods, certain applications on the liquids and gases encased in the human body.

Many currently available designs for pressure indicating, based on mechanical or electronic principles, have in common, the fact that an appreciable amount of the medium is introduced into the recording system, from which sterile recovery is impossible, and which is herein referred to as a loss of medium. This may well endanger a patient's life in connection with a pressure indicating or recording of liquor at pathological pressure conditions. Designs so arranged that this probelm has been eliminated are of particularly complicated construction, hence initial cost and maintenance are extremely expensive.

The device for recording pressure according to the invention consists of a transparent cylinder, in which is arranged a mobile rod-piston assembly. The cylinder is connected through a channel to a nozzle, where a replaceable puncture needle (channelled) is inserted. The free end of this needle may be introduced into the mentioned liquids or gases, which via the needle may propagate into the nozzle. The particulars of the device are as follows. The nozzle consists of a transparent material fabricated tube, which in the lateral direction is furnished with at least one level mark. Furthermore, at least one pressure unit scale is arranged beside the cylinder or its piston rod, against which the liquid or gas pressure might be indicated, when the liquid or the gas by discharge from the encased chamber is brought to reach the level mark in the nozzle, and retained there by action of the gas or air cushion, created between the piston and the needle. This cushion is the counter pressure medium against the liquid or the gas, whereby the mentioned liquid or gas is prevented from propagating into the cylinder, as well as securing its return to the encased chamber.

The device is further characterized by the U-shaped nozzle design, whereby the channel between the two nozzle ends becomes considerably longer than a straight line distance between the same. This arrangement is made with the intention of retarding the progress of the gas or the liquid through the nozzle, until the gas or air cushion counter pressure has been activated.

Two separate designs of the device according to the invention, modifications and details inclusive, are described below in connection with the annexed drawing wherein.

FIG. 1 shows a longitudinal section of the device according to the one of the two designs.

FIG. 2 shows a view of the nozzle according to a modified form.

FIG. 3 shows a view of the nozzle according to a second modified form.

FIG. 4 shows part of the device according to the second design.

FIG. 5 shows schematically a view of a calibration instrument, intended to be used in certain cases in connection with the device according to the invention.

In FIG. 1 the device is shown in vertical position. The cylinder and its surrounding transparent graduated housing are partly shown in cross section. A liquid filled hollow chamber shown at 1' is confined by a wall 1". The puncture needle is shown at 1 while 2 denotes the nozzle that is attached to the needle and, which is made from glass and has a channel 2'. The level mark or the nozzle adjustment mark is represented by 3. The faucet system connected to the nozzle 2 consists of a threeway valve 4 with its channels 5, 6, and 7. The channel 6 is designed with adequate faucet position to allow drainage of gases or liquids from the medium 1', or from the cylinder 8, subsequent to deliberate aspiration. The channel 6 is also intended for feeding liquids or gases to the medium 1'. The channel 7 is connected to the cylinder 8, housing a gastight piston 9. This piston, which may be of such gastight material as Teflon, is furnished with a surrounding coil 10 and a piston rod spring 11.

When a liquid of a certain viscosity, for example liquor, penetrates into the puncture needle 1 and enters the nozzle channel 2', a spring counter pressure is applied manually against the piston rod 10. By action of the gastight piston 9, the air in the cylinder 8, as well as that in the expansion chamber 8', will be compressed. This expansion chamber 8', which may be opened as well as entirely removed from the device, is connected by a channel, in which is installed a valve 8", to the channel 2' in the nozzle 2. In this way the increase of liquor in the channel 2' is checked. The manual counter pressure is adjusted in such a way as to bring the boundary surface between the liquid, i.e. the liquor, and the air to the level mark 3. Thus the piston 9, which through the action of the piston rod spring 11 was situated in its top position, i.e. immediately below the cylinder cover (FIG. 1), is deplaced downwards in the cylinder 8. When the boundary surface between the air and the liquid is stationary at the level mark 3, the pressure of the outward streaming liquid equals the pressure of the compressed air volume in the cylinder 8 plus the compression chamber 8'. As the transparent glass cylinder is surrounded by a transparent revolving housing 12, furnished with pressure unit scales 13, for instance in mm. $H_2O$ or Hg, the pressure can directly be read against the scale, using the piston's position in the cylinder 8 as indicator.

FIG. 2 shows the nozzle 2a in a modified form, characterized by its elongated U-shape and its being furnished with a long channel 16 of narrow caliber. This nozzle 2a may be used in connection with recording the pressure of liquids of low viscosity, subjected to relatively high pressure conditions. This, because of the progress of the liquid may be followed visually, enabling the build up of an adequate counter pressure before any of the liquid reaches the recording system. Thus, loss of the medium 1' is effectively prevented.

FIG. 3 shows a second modification of the nozzle 2b in operating position. The nozzle 2b connection to the channel 5 has such characteristics that attachment can be made only when the device is in operating position, i.e., in vertical position. Even this nozzle 2b is U-shaped. Its channel 17 is, however, so adjusted that, when used in conjunction with the cylinder 8 and the expansion chamber 8', its net volume is greater than the added air volume of the mentioned cylinder and expansion chamber under uncharged pressure conditions, i.e., the piston 9 being in its top position (FIG. 1). The channel 17 of nozzle 2b is intended to be filled completely with for example a sterile physiological salt solution. The nozzle construction results in the absolute prevention of air from being introduced into the medium 1', because even if the piston 9, accidentally or caused by other reasons, should be forced to the bottom of the cylinder 8, the trapped air can be forced no farther than to channel 17 in nozzle 2b. The channel 17 will, thus, become partly filled with air, while the liquid present in the same will be forced to enter the medium 1'. Air, however, can never be introduced into the medium 1'. In FIG. 3, a graduated scale on one of the legs is visualized. This scale enables continual recordings of pressure variations, subsequent to adjusting the liquid/gas boundary surface at the level mark 3. The nozzle 2a, shown in FIG. 2, may similarly be furnished with the mentioned graduated scale. At pressure recordings where even a diminutive amount of the medium 1' (corresponding to the added interior volume of the puncture needle and the nozzle channel as far as the level mark) cannot be allowed to leave the medium 1', the mentioned volume may of course be filled with a liquid as far as the level mark 3, through aspiration with the piston 9 or in some other way, before puncture is made.

Fig. 4 shows schematically a separate design of the piston 9' and the piston rod 10', where the piston 9' is furnished with a suitable type of sealing rings 15 to ensure gastightness. The piston rod 10' is further designed with suitable threads and placed in a threaded housing 14. The counter pressure build up is caused by screwing the piston rod 10' downwards.

The piston rod 10' may through jack or something similar in the threads be graduated with pressure unit scales 19, thus replacing the graduation device represented by the mentioned housing 12. This construction enables counter pressure build up at particularly high pressures.

The principle in its above described construction forms may even be utilized for indicating gas pressure. In this case a small amount of liquid 18 is introduced into the nozzle before pressure recording, as shown in FIG. 2. This liquid acts as a buffer between the two gases, i.e., between the gas, the pressure of which is to be indicated, and the air (gas) in the indicating system.

The mentioned device and principle is even applicable in the case of indicating negative pressure in gases or liquids. In such case, the initially marked position of the piston 9, at commencing indications, is arranged in the lower part of the cylinder 8. Upward motion of the piston 9 during indications will create a negative pressure in the cyliner 8 and its connected expansion chamber 8'. This negative pressure equals that of the liquid or the gas, the negative pressure of which is to be indicated, when the liquid boundary surface or the small amount of liquid 18 respectively have been positioned to the level mark 3. The position of the picture 9 in the cylinder 8 is in this case the indicator of the negative pressure in connection with an adequately calibrated and graduated scale on the housing 12.

In FIG. 5 is shown a simple and adequate calibration instrument for the described pressure indicating device. This instrument consists of a leakproof cylinder, equipped with an inlet, drain, and a manometer, as well as pressure unit scales on the cylinder. The pressure indicating device to be calibrated is connected to the instrument, and then subjected to given liquid or gas pressures, which correspond to the various applications of the device.

Due to the fact that principle of the pressure indicating device according to the invention is based on an enclosed gas volume, for example, air under negative or positive pressure, contingencies must be made for variations in temperature where stringent prerequisites as to measuring accuracy prevails.

A variation in temperature of 10° C. will produce a corresponding variation in gas volume of roughly 3%. Large variations in temperature may, thus, lead to small discrepancies in measuring accuracy. This effect is eliminated by separate pressure calibrations for different temperature ranges. In connection with medical applications of the device, where pressure recordings are performed at room temperature with the air or gas containing chambers carefully insulated, this effect has no impact.

The provision of adequate calibration and gastight construction being ensured, this device represents an inexpensive instrument for recording pressure in liquids and gases, which is easy to handle, assemble, and dismount, as well as sterilize before use. The device is particularly suited for medical applications under sterile conditions, though it can be used for a wide variety of industrial purposes as well.

The invention is not limited to the above described, and in the attached drawing clarified, construction forms with modifications, but it can be varied further in a number of ways, within the framework of the invention idea. Examples of this are placing the cylinder and the expansion chamber in other locations on the device, as well as using expansion chambers of varying interior volume for certain given pressure ranges. For industrial applications the puncture needle may be replaced with a leakproof-connected tube between the medium and the pressure recording device.

We claim:
1. A device for the measurement of the pressure of liquids and/or gases enclosed in spaces, vessels, or organs isolated from the atmosphere, such as in a human or animal body, said device comprising a transparent cylinder containing a slidable piston provided with a piston-rod, said cylinder having a duct connected to a nozzle provided with a channel, a puncture needle provided with a channel and being interchangeably fitted in said nozzle, an expansion chamber connected to the connecting duct, the nozzle comprising a tube of transparent material, said tube being provided with at least one latitudinal level mark, characterized in that all component parts of the device are of rigid material and are combined in a rigid unit, a three-way valve, the connecting duct between the nozzle and the cylinder being connected to said three-way valve, which valve is connected to a discharge channel, and the piston-rod being biased by spring means, and that the cylinder is provided with at least one pressure unit graduation.

2. A device according to claim 1, characterized by the fact that the piston-rod is provided with at least one pressure unit graduation.

3. A device according to claim 1, characterized by the fact that the piston rod is provided with threads adapted to engage the top of the cylinder.

4. A device according to claim 1, characterized in that said cylinder is surrounded by a revolving, transparent collar provided with said pressure unit graduation.

5. A device according to claim 1, characterized by the fact that the nozzle is U-shaped, so that the channel in the nozzle is appreciably longer than the direct distance between the ends of the nozzle.

6. A device according to claim 5, characterized in that one leg of the U-shaped nozzle has a greater interior volume than the other leg.

References Cited by the Examiner
UNITED STATES PATENTS
1,900,775   3/33   Star _____ 73—401 X FOREIGN PATENTS
830,729   5/38   France.

(Other references on following page)

OTHER REFERENCES

A Simple Micromanometer, by E. Kovacic, Journal of Scientific Instruments, vol. 30, September 1953, pages 304 and 305.

The Phlebomanometer, by G. E. Burch et al., Journal of the American Medical Association, vol. 123, No. 2, Sept. 11, 1943, pages 91 and 92.

RICHARD C. QUEISSER, *Primary Examiner.*

ROBERT L. EVANS, *Examiner.*